United States Patent
Subbaraya et al.

(10) Patent No.: US 11,443,187 B2
(45) Date of Patent: Sep. 13, 2022

(54) METHOD AND SYSTEM FOR IMPROVING CLASSIFICATIONS PERFORMED BY AN ARTIFICIAL NEURAL NETWORK (ANN) MODEL

(71) Applicant: Wipro Limited, Bangalore (IN)

(72) Inventors: Prashanth Krishnapura Subbaraya, Bengaluru (IN); Raghavendra Hosabettu, Bangalore (IN)

(73) Assignee: Wipro Limited, Bangalore (IN)

( * ) Notice: Subject to any disclaimer, the term of this patent is extended or adjusted under 35 U.S.C. 154(b) by 499 days.

(21) Appl. No.: 16/701,447

(22) Filed: Dec. 3, 2019

(65) Prior Publication Data

US 2021/0103810 A1 Apr. 8, 2021

(30) Foreign Application Priority Data

Oct. 7, 2019 (IN) .............................. 201941040506

(51) Int. Cl.
*G06N 3/08* (2006.01)
*G06N 3/04* (2006.01)

(52) U.S. Cl.
CPC ................ *G06N 3/08* (2013.01); *G06N 3/04* (2013.01); *G06N 3/0481* (2013.01)

(58) Field of Classification Search
CPC .. G06N 3/08; G06N 3/02; G06N 3/04; G06N 3/0481
See application file for complete search history.

(56) References Cited

U.S. PATENT DOCUMENTS

| 5,398,300 | A | 3/1995 | Levey |
| 10,515,312 | B1* | 12/2019 | Kubo ..................... G06N 3/084 |
| 2015/0117785 | A1 | 4/2015 | Lee et al. |
| 2018/0121748 | A1 | 5/2018 | Kwak et al. |
| 2020/0012945 | A1* | 1/2020 | Yaguchi .............. G06N 3/0454 |

(Continued)

OTHER PUBLICATIONS

Darlington, K., "Explainable AI Systems: Understanding the Decisions of the Machines", 2017, (https://www.bbvaopenmind.com/en/authors/keith-darlington/), pp. 1-9.

(Continued)

*Primary Examiner* — Samuel G Neway
(74) *Attorney, Agent, or Firm* — Finnegan, Henderson, Farabow, Garrett & Dunner, LLP

(57) ABSTRACT

This disclosure relates to method and system for improving classifications performed by artificial neural network (ANN) model. The method may include identifying, for a classification performed by the ANN model for an input, activated neurons in each neural layer of the ANN model; and analyzing the activated neurons in each neural layer with respect to Characteristic Feature Directive (CFDs) for corresponding neural layer and for a correct class of the input. The CFDs for each neural layer may be generated after a training phase of the ANN model and based on neurons in corresponding neural layer that may be activated for a training input of the correct class. The method may further include determining differentiating neurons in each neural layer that are not activated as per the CFDs for the correct class of the input based on the analysis; and providing missing features based on the differentiating neurons.

20 Claims, 5 Drawing Sheets

(56) References Cited

U.S. PATENT DOCUMENTS

| | | | |
|---|---|---|---|
| 2020/0134376 A1* | 4/2020 | Sallee | G06V 10/82 |
| 2020/0202214 A1* | 6/2020 | Peranandam | G06K 9/6273 |
| 2020/0234128 A1* | 7/2020 | Lin | G06N 3/04 |
| 2021/0103810 A1* | 4/2021 | Subbaraya | G06N 3/105 |
| 2021/0357729 A1* | 11/2021 | Leino | G06F 17/18 |

OTHER PUBLICATIONS

Du, M., et al., "Towards Explanation of DNN-based Prediction with Guided Feature Inversion", KDD 2018, Association for Computing Machinery, arXiv:1804.005606v2 [cs.CV], 10 pages.

Shadlen, M., et al., "Decision making and sequential sampling from memory", 2016, Neuron, pp. 1-25.

* cited by examiner

METHOD AND SYSTEM FOR IMPROVING CLASSIFICATIONS PERFORMED BY AN ARTIFICIAL NEURAL NETWORK (ANN) MODEL

TECHNICAL FIELD

This disclosure relates generally to artificial neural network (ANN), and more particularly to method and system for improving classifications performed by an ANN model.

BACKGROUND

Artificial neural network (ANN) may be employed in a wide variety of applications, including, but not limited to, computer vision, image recognition, natural language processing, speech recognition, and descision making. An ANN may learn to perform a task by considering examples, generally without being programmed with any task-specific rules. For example, in image recognition, the ANN may learn to identify specific objects in images by analyzing example images that may or may not have such specific objects. The ANN is based on a collection of connected nodes called 'neural nodes' or 'neurons' aggregated into one or more layers called 'neural layers'. The connections between 'neurons' are called 'edges'. Each of the 'neurons' and 'edges' may have a 'weight' that may adjust as learning proceeds.

The inability to clearly understand and explain the reason for a decision taken by the ANN is one of the main differences between artificial and human intelligence. As stated above, the ANN may usually provide an answer based on the data they have learned but not a reason for how it arrived at that answer. Thus, in many ANN based applications, it is difficult to find how the ANN made a specific decision. This limitation may pose challenges in improving the decision making of the ANN or altering the decision making of the ANN so as to minimize false positives. It may, therefore, be desirable to understand and explain how an ANN came to a particular decision, so as to further improve the decision making of the ANN.

SUMMARY

In one embodiment, a method for improving classifications performed by an Artificial Neural Network (ANN) model is disclosed. The method may include identifying, for a classification performed by the ANN model for an input, one or more activated neurons in one or more neural layers of the ANN model. The one or more activated neurons may be neurons achieving respective activation threshold values for the input and corresponding to one or more relevant features associated with the input. The method may further include analyzing the one or more activated neurons in the one or more neural layers with respect to one or more Characteristic Feature Directive (CFDs) for the one or more neural layers and for a correct class of the input. The one or more CFDs may be generated after a training phase of the ANN model and based on one or more neurons in the one or more neural layers that are activated for a training input of the correct class. The method may further include determining one or more differentiating neurons in the one or more neural layers based on the analysis. The one or more differentiating neurons may be neurons that are not activated as per the one or more CFDs for the correct class of the input. The method may further include providing one or more missing features based on the one or more differentiating neurons in the one or more neural layers for improving classifications performed by the ANN model.

In one embodiment, a system for improving classifications performed by an ANN model is disclosed. The system may include an ANN classification device, which may include at least one processor and a memory communicatively coupled to the at least one processor. The memory may store processor-executable instructions, which, on execution, may cause the processor to identify, for a classification performed by the ANN model for an input, one or more activated neurons in one or more neural layers of the ANN model. The one or more activated neurons may be neurons achieving respective activation threshold values for the input and corresponding to one or more relevant features associated with the input. The processor-executable instructions, on execution, may further cause the processor to analyze the one or more activated neurons in the one or more neural layers with respect to one or more Characteristic Feature Directive (CFDs) for the one or more neural layers and for a correct class of the input. The one or more CFDs may be generated after a training phase of the ANN model and based on one or more neurons in the one or more neural layers that are activated for a training input of the correct class. The processor-executable instructions, on execution, may further cause the processor to determine one or more differentiating neurons in the one or more neural layers based on the analysis. The one or more differentiating neurons may be neurons that are not activated as per the one or more CFDs for the correct class of the input. The processor-executable instructions, on execution, may further cause the processor to provide one or more missing features based on the one or more differentiating neurons in the one or more neural layers for improving classifications performed by the ANN model:

In one embodiment, a non-transitory computer-readable medium storing computer-executable instructions for improving classifications performed of an ANN model is disclosed. The stored instructions, when executed by a processor, may cause the processor to perform operations including identifying, for a classification performed by the ANN model for an input, one or more activated neurons in one or more neural layers of the ANN model. The one or more activated neurons may be neurons achieving respective activation threshold values for the input and corresponding to one or more relevant features associated with the input. The operations may further include analyzing the one or more activated neurons in the one or more neural layers with respect to one or more Characteristic Feature Directive (CFDs) for the one or more neural layers and for a correct class of the input. The one or more CFDs may be generated after a training phase of the ANN model and based on one or more neurons in the one or more neural layers that are activated for a training input of the correct class. The operations may further include determining one or more differentiating neurons in the one or more neural layers based on the analysis. The one or more differentiating neurons may be neurons that are not activated as per the one or more CFDs for the correct class of the input. The operations may further include providing one or more missing features based on the one or more differentiating neurons in the one or more neural layers for improving classifications performed by the ANN model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 1:
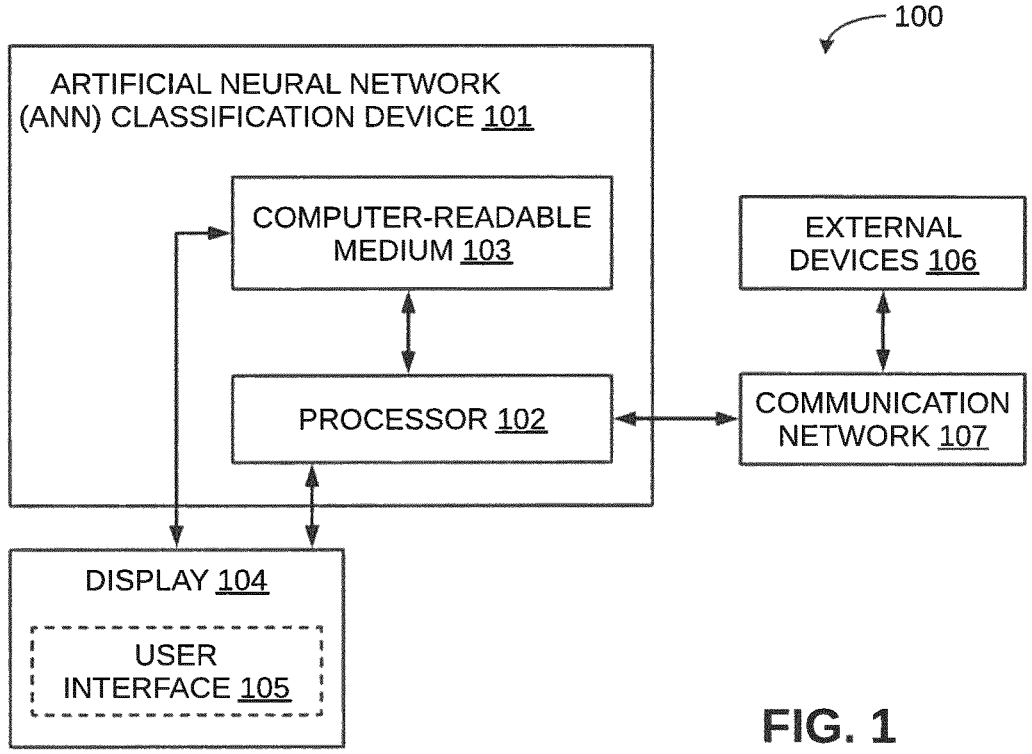
FIG. 1 is a block diagram of an exemplary system for improving classifications performed by an artificial neural network (ANN) model, in accordance with some embodiments of the present disclosure.

Referring now to FIG. 1, an exemplary system 100 for improving classifications performed by an artificial neural network (ANN) is illustrated, in accordance with some embodiments of the present disclosure. The system 100 may include an ANN classification device 101 for performing classifications. As will be appreciated, the ANN classification device 101 may implement an ANN model so as to perform classifications. The ANN model may be built and trained for a target classification application including, but not limited to, image classification applications. Further, the ANN classification device 101 may provide an explanation or rational for the classifications performed by the ANN model, in accordance with some embodiments of the present disclosure. This understanding may enable the ANN classification device 101 to improve the classifications performed by the ANN model and, therefore, to reduce the false positives. The ANN classification device may take the form of any computing device including, but not limited to, server, desktop, laptop, notebook, netbook, tablet, smartphone, and mobile phone.

As will be described in greater detail in conjunction with FIGS. 2-5, the ANN classification device may identify, for a classification performed by the ANN model for an input, one or more activated neurons in one or more neural layers of the ANN model. It may be noted that the one or more activated neurons are neurons achieving respective activation threshold values for the input and corresponding to one or more relevant features associated with the input. The ANN classification device may further analyze the one or more activated neurons in the one or more neural layers with respect to one or more Characteristic Feature Directive (CFDs) for the one or more neural layers and for a correct class of the input. Again, it may be noted that the one or more CFDs are generated after a training phase of the ANN model and based on one or more neurons in the one or more neural layers that are activated for a training input of the correct class. Further, it may be noted that the correct class is actual class to which the input belongs to. The ANN classification device may further determine one or more differentiating neurons in the one or more neural layers based on the analysis. It may be noted that the one or more differentiating neurons are neurons that are not activated as per the one or more CFDs for the correct class of the input. The ANN classification device may further provide one or more missing features based on the one or more differentiating neurons in the one or more neural layers for improving classifications performed by the ANN model. In other words, the CFDs are directives as per which the ANN model may perform a correct classification. Thus, for any incorrect classification, the ANN model may not have acted as per the CFDs. An analysis of such omission in actions may, therefore, provide rational for the incorrect classification.

The ANN classification device 101 may include one or more processors 102 and a computer-readable medium (for example, a memory) 103. The computer-readable storage medium 103 may store instructions that, when executed by the one or more processors 102, cause the one or more processors 102 to improve classifications performed by the ANN model, in accordance with aspects of the present disclosure. The computer-readable storage medium 103 may also store various data (for example, activated neurons data, Characteristic Feature Directives (CFDs) data, differentiating neurons data, missing features data, new training data, and the like) that may be captured, processed, and/or required by the ANN classification device 101. The ANN classification device 101 may interact with a user via a user interface 105 accessible via a display 104. The ANN classification device 101 may also interact with one or more external devices 106 over a communication network 107 for sending or receiving various data. The external devices 106 may include, but may not be limited to, a remote server, a digital device, or another computing system.

Figure 2:
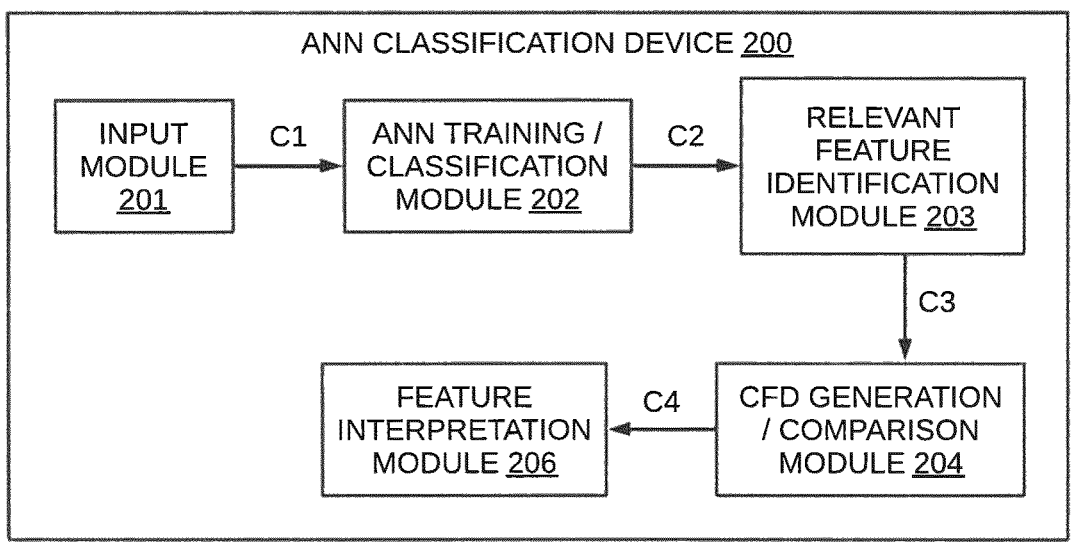
FIG. 2 is a functional block diagram of an ANN classification device, in accordance with some embodiments of the present disclosure.

Referring now to FIG. 2, a functional block diagram of an ANN classification device 200, analogous to the ANN classification device 101 implemented by the system 100, is illustrated, in accordance with some embodiments of the present disclosure. The ANN classification device 200 may include various modules that perform various functions so as to determine one or more differentiating neurons for a neural layer based on an analysis of one or more activated neurons in the neural layer with respect to CFDs for the neural layer, and to provide one or more missing features based on the one or more differentiating neurons for improving classifications performed by the ANN model. In some embodiments, the ANN classification device 200 may include an input module 201, an ANN training/classification module 202, a relevant feature identification module 203, a Characteristic Feature Directive (CFD) generation/comparison module 204, and a feature interpretation module 205.

As will be appreciated by those skilled in the art, all such aforementioned modules 201-205 may be represented as a single module or a combination of different modules. Further, as will be appreciated by those skilled in the art, each of the modules 201-205 may reside, in whole or in parts, on one device or multiple devices in communication with each other. In some embodiments, each of the modules 201-205 may be implemented as dedicated hardware circuit comprising custom application-specific integrated circuit (ASIC) or gate arrays, off-the-shelf semiconductors such as logic chips, transistors, or other discrete components. Each of the modules 201-205 may also be implemented in a programmable hardware device such as a field programmable gate array (FPGA), programmable array logic, programmable logic device, and so forth. Alternatively, each of the modules 201-205 may be implemented in software for execution by various types of processors (e.g., processor 102). An identified module of executable code may, for instance, include one or more physical or logical blocks of computer instructions which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

The input module 201 may receive input data for an ANN model. In some embodiments, the input data may be training data for training the ANN model during training phase. The input data may include, but may not be limited to, image data, text data, or the like. The input module 201 may convert the input data into a vectorized form, and then feed the vectorized data to the ANN training/classification module 202.

The ANN training/classification module 202 may receive the vectorized data (i.e., vectorized training data) from the input module 201 via a Cl interface using standard wired or wireless data transfer protocols. During training phase, the ANN training/classification module 202 may build and train the ANN model with the vectorized data for a target classification application. Upon training, the vectorized data used for the purpose of training may be fed to the trained ANN model to obtain output. The obtained output may be separated based on respective classification, so as to generate CFDs for each classification performed by the ANN model. Further, during operation phase, the ANN training/classification module 202 may perform classification of the input data using the trained ANN model.

The relevant feature identification module 203 may receive the trained ANN model along with the vectorized input data (Le., vectorized data used for training the ANN model or vectorized data used for generating the output) via a C2 interface, The relevant feature identification module 203 may calculate activation threshold value based on an activation function. It may be noted that the activation function is a function employed at each neuron to generate an output at that neuron. The activation function may be defined while building and training the ANN model. The activation function may include, but may not be limited to, sigmoid or logistic function, hyperbolic tangent (Tanh) function, and rectified linear units (ReLu) function. The neurons with an output higher than the threshold value may be considered as activated neurons. It may be noted that the one or more neurons may correspond to one or more features associated with the input data. Thus, the one or more activated neurons may correspond to relevant features associated with the input. Further, it may be noted that the activated neurons may be identified for all the input vectorized data and for all the neural layers of the ANN. Accordingly, relevant features for each layer of the ANN may be identified.

The CFD generation/comparison module 204 may receive the relevant features and values associated with the relevant features (i.e., output of activated neurons) via a C3 connector. As mentioned earlier, upon training, the training input data may be employed to generate the CFDs. Thus, the CFD generation/comparison module 204 may determine one or more CFDs of each neural layer of the ANN model using output of activated neurons for the training input data. Further, as mentioned earlier, the output may be separated based on respective classification, so as to generate CFDs for each classification performed by the ANN model. Further, in operational phase, the CFD generation/comparison module 204 may determine one or more differentiating neurons for an input based on the one or more CFDs generated for a correct class of that input. It may be noted that the differentiating neurons are neurons that are not activated as per the one or more CFDs for the correct class of the input. In other words, the one or more CFDs are rules (generated automatically based on different metrics) in order to explain the reason for an output given by the ANN model.

The feature interpretation module 205 may receive an output, for example, one or more differentiating neurons via a connector C4 connector. The feature interpretation module 205 may map the differentiating neurons to missing features. For example, the feature interpretation module 205 may provide characteristic features that are mandatorily required for getting a correct output for a given input. In some embodiments, the feature interpretation module 205 may provide the missing features in a human understandable format.

As will be appreciated by one skilled in the art, a variety of processes may be employed for improving classifications performed by an ANN model. For example, the exemplary system 100 and the associated ANN classification device 101 may improve the classifications performed by the ANN model by the processes discussed herein. In particular, as will be appreciated by those of ordinary skill in the art, control logic and/or automated routines for performing the techniques and steps described herein may be implemented by the system 100 and the ANN classification device 101, either by hardware, software, or combinations of hardware and software. For example, suitable code may be accessed and executed by the one or more processors on the system 100 and the associated ANN classification device 101 to perform some or all of the techniques described herein. Similarly, application-specific integrated circuits (ASICs) configured to perform some or all of the processes described herein may be included in the one or more processors on the system 100.

Figure 3:
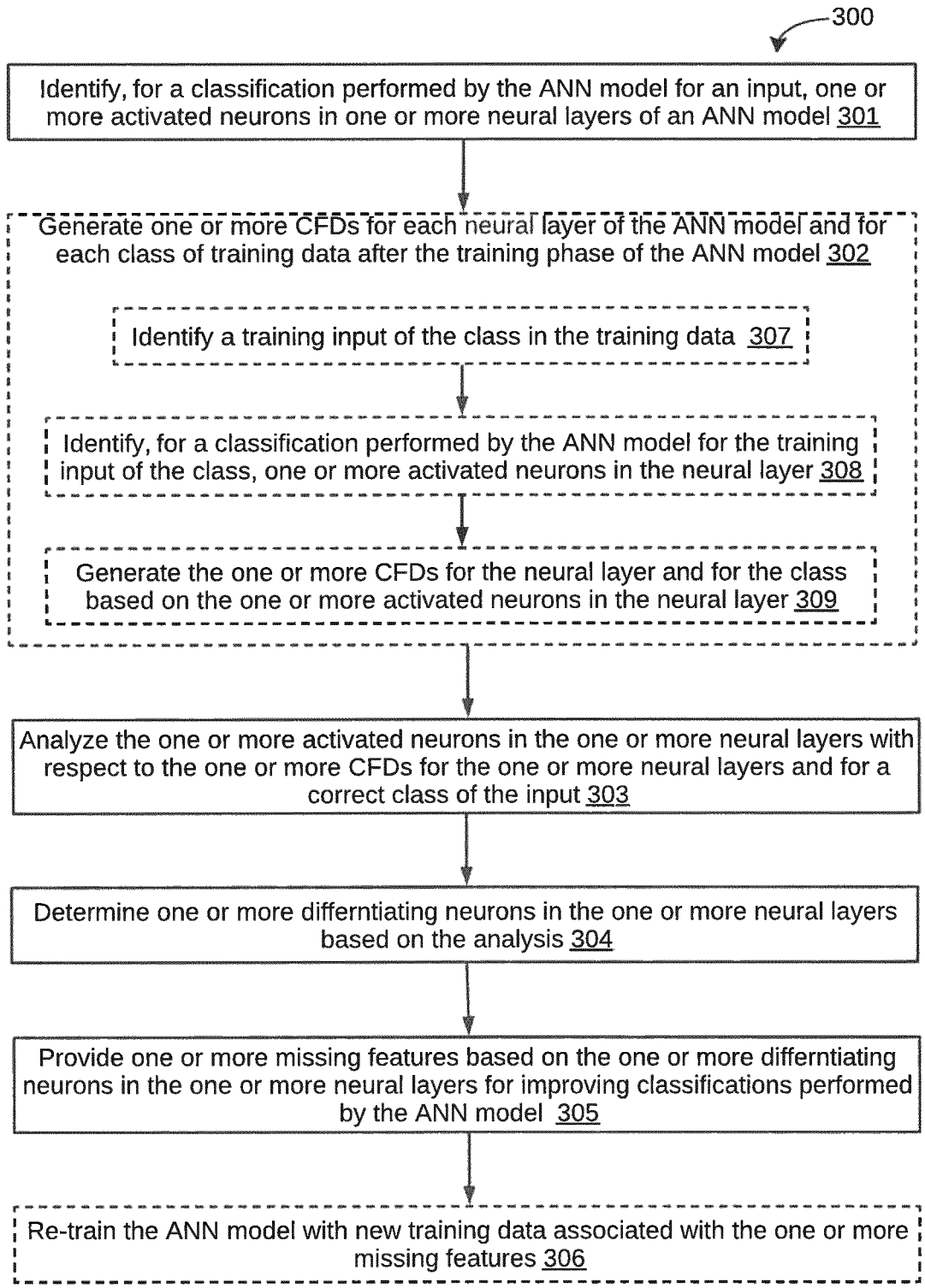
FIG. 3 is a flow diagram of an exemplary process for improving classifications performed by an ANN model, in accordance with some embodiments of the present disclosure.

For example, referring now to FIG. 3, an exemplary control logic 300 for improving classifications performed by an ANN model via a system, such as the system 100, is depicted via a flowchart, in accordance with some embodiments of the present disclosure. As illustrated in the flowchart, the control logic 300 may include the steps of identifying, for a classification performed by the ANN model for an input, one or more activated neurons in one or more neural layers of the ANN model at step 301, analyzing the one or more activated neurons in the one or more neural layers with respect to one or more Characteristic Feature Directive (CFDs) for the one or more neural layers and for a correct class of the input at step 303, determining one or more differentiating neurons in the one or more neural layers based on the analysis at step 304, and providing one or more missing features based on the one or more differentiating neurons in the one or more neural layers for improving classifications performed by the ANN model at step 305. Additionally, in some embodiments, the control logic 300 may include the step of re-training the ANN model with new training data associated with the one or more missing features at step 306.

In some embodiments, the one or more activated neurons at step 301 may be identified as neurons that achieve respective activation threshold values for the input and that correspond to one or more relevant features associated with the input. Additionally, in some embodiments, the one or more CFDs at step 303 may be generated after a training phase of the ANN model and may be based on one or more neurons in the one or more neural layers that are activated for a training input of the correct class. Further, in some embodiments, the one or more differentiating neurons at step 304 may be neurons that are not activated as per the one or more CFDs for the correct class of the input. Moreover, in some embodiments, the one or more missing features at step 305 may be provided to a user in a user-understandable format. It should be noted that, in some embodiments, the ANN model may be a Convolutional Neural Network (CNN) model.

In some embodiments, the control logic 300 may further include the step of generating the one or more CFDs for each neural layer of the ANN model and for each class of training data after the training phase of the ANN model at step 302. In such embodiments, generating the one or more CFDs for a neural layer and for a class at step 302 may include the steps of identifying a training input of the class in the training data at step 307 and identifying, for a classification performed by the ANN model for the training input of the class, one or more activated neurons in the neural layer at step 308. As above, the one or more activated neurons at step 308 may be identified as neurons that achieve respective activation threshold values for the training input of the class. Further, in such embodiments, generating the one or more CFDs for a neural layer and for a class at step 302 may include the step of generating the one or more CFDs for the neural layer and for the class based on the one or more activated neurons in the neural layer at step 309.

By way of an example, in some embodiments, the one or more CFDs in a neural layer may include a maximum value associated with the one or more activated neurons in the neural layer, a minimum value associated with the one or more activated neurons in the neural layer, a number of the one or more activated neurons in the neural layer, a list of the one or more activated neurons in the neural layer, and one or more mandatory neurons in the neural layer for performing the classification in the correct class, and so forth.

Figure 4:
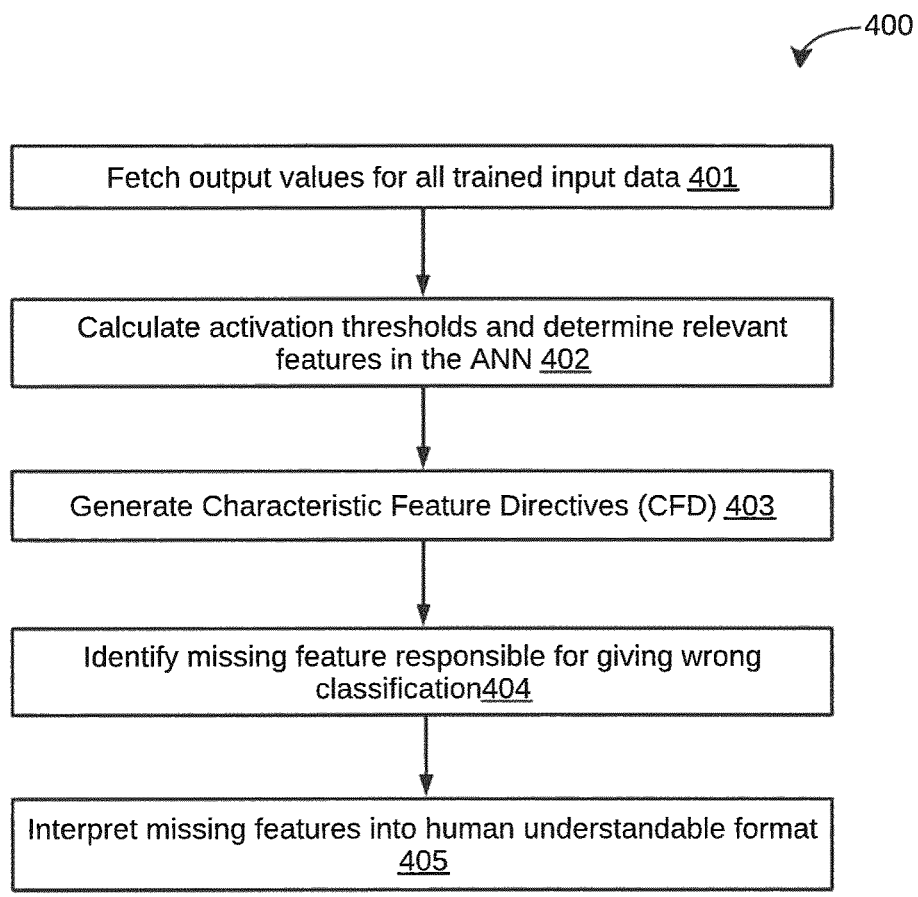
FIG. 4 is a flow diagram of a detailed exemplary process for improving classifications performed by an ANN model, in accordance with some embodiments of the present disclosure.

Referring now to FIG. 4, exemplary control logic 400 for improving classifications performed by an ANN model is depicted in greater detail via a flowchart, in accordance with some embodiments of the present disclosure. As illustrated in the flowchart, at step 401, the control logic 400 may fetch output values for trained input data. It may be noted that data used for training the ANN model may be used again as the input data so as to predict results from the ANN model. It may be further noted that for every classification, one or more CFDs may be generated. The step 401 is further explained thorough an exemplary case, in conjunction with FIG. 5.

Figure 5:
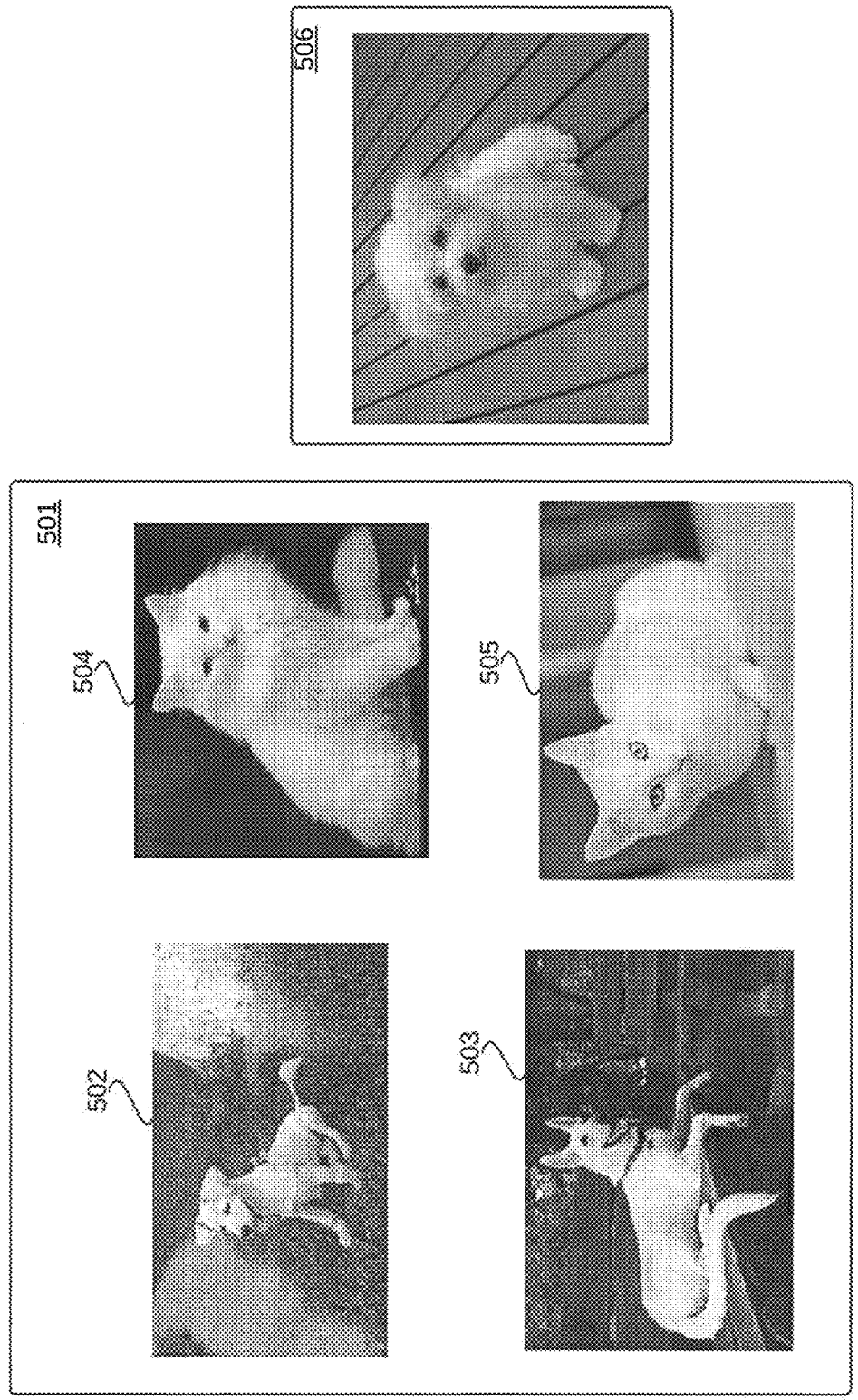
FIG. 5 is an exemplary training input data and test input data, in accordance with some embodiments of the present disclosure.

Referring now to FIG. 5, training input data 501 and test input data 506 for feeding in an ANN model is illustrated, in accordance with an embodiment. In some embodiments, the ANN model may be a CNN based, single neural layer, binary, image classifier that may be trained to classify images of dogs and cats using training input data. Once the ANN model is trained, the training input data 501 used for training the ANN model may be used as input to obtain output from the ANN model. As will be appreciated, the trained ANN model may correctly predict results for each image in the training input data 501. As illustrated, the training input data 501 may include four images 502, 503, 504, and 505. Of these, two images 502 and 503 are of dogs, while the remaining two images 504 and 505 are of cats. The training input data 501 may be passed through the ANN model to obtain an output.

It is assumed that each input data is passed through the neural network model to get the predictions. As illustrated, in an exemplary scenario, a correct output is obtained corresponding to each image of the training input data 501 (i.e. the output is 'dog' for images 502 and 503, and 'cat' for images 504 and 505 being fed into the ANN model). However, when a test input data 506 including an image of a dog is fed in the ANN model, the output obtained corresponding to the test input data 506 is incorrect, for example, the output is 'cat'. As it will be appreciated, the incorrect output may be due to multiple reasons. For example, the multiple reasons may include a size of the image, presence or absence of features like hairs, tail, visibility of ears, shape of eyes, etc. However, an actual reason is unknown. To understand the reason for incorrect output, the proposed solution provides for and employs characteristic feature directives (CFDs). As discussed above, the CFDs are directives as per which the ANN model may generate a correct classification. Thus, for any incorrect classification, the ANN model may not have acted as per the CFDs. An analysis of such omission in actions may, therefore, provide rational for the incorrect classification.

Retuning back to FIG. 4, at step 402, the control logic 400 may calculate an activation threshold and determine relevant features. The input data may be passed to the ANN model and an adaptive activation threshold value may be calculated. It may be understood that one or more neurons may be activated after crossing a certain threshold value. The one or more activated neurons may correspond to one or more features of the input data. It may be noted that these features may be the reason for the ANN model to generate an output.

In some embodiments, a list of the one or more activated neurons corresponding to each neural layer and for each input data of a certain class may be generated. Thereafter, an intersection of the one or more activated neurons may be obtained to determine one or more relevant features of the certain class. It may be noted that these relevant features are features that should be typically present for the ANN model to generate a correct output for any kind of input in the certain class. Additionally, in some embodiments, a neuron window may be determined. In some embodiments, the neurons which are outside the neuron window may be dropped-out in order to improve performance of the ANN model.

By way of an example, a CNN architecture with Relu activation function may be used for obtaining output for an input data. An example of Relu activation function is given below:

$$R(z) = \max(0, z)$$

It may be understood that a neuron may be activated only when its value is positive. Since in the above example, the activation threshold is zero, therefore, neurons having values higher than zero may be considered as relevant features.

Referring to the above example, all the images belonging to the training input data 501 for a classification 'cat' (i.e. images 504 and 505 for which the output determined is 'cat') may be received. Assuming that the CNN model used for obtaining the output includes four neurons having weights [−0.2, 0.4, 0.5, 0.01]. When the input values (values associated with each neuron) are multiplied with the weights, the first neuron gives a negative value, which is less than the activation threshold. As a result, the first neuron is not considered as a relevant feature. The process is repeated for all the inputs belonging to the classification 'cat'.

At step 403, one or more CFDs may be generated. Upon determining all the relevant features, one or more CFDs may be generated for each neural layer of the ANN model and for each class of training data after the training phase of the ANN model. In this step, after getting all the relevant features, the CFDs may be generated for the network like, the maximum and minimum value for a neuron, number of neurons to be activated in a neural layer, neurons which are mandatory for the output, etc. First, a neural layer and the neurons that are activated in that neural layer are considered. The highest value of the neuron that is activated, for all the inputs, may be considered as the maximum threshold for that neural layer. Similarly, the lowest value of the neuron that is activated, for all the inputs, may be considered as the minimum value for that neural layer. Therefore, in this way, two CFDs may be generated. The number of neurons activated in that neural layer may be a third CFD that may be generated. The list of all the activated neuron for all output may be the fourth CFD that may give the mandatory neurons that are required. These CFDs may be used to test with the new inputs while prediction to help the user explain the reason for the decision taken by the network.

In other words, the one or more CFDs may include a number of the one or more activated neurons in the neural layer, a list of the one or more activated neurons in the neural layer, and one or more mandatory neurons mandatory for performing the classification in the correct class. It may be noted that the list of the one or more activated neurons in the neural layer may provide the one or more mandatory neurons. It may be further noted that the mandatory features may be obtained based on intersection of all the relevant features. The features which are activated for all the inputs of a particular class may be considered as mandatory features.

Referring once again to the above example, relevant features for the classification 'cat' may include "white color", "fur", "2 eyes", "3 legs", "eye color", etc. It may be understood that the above features are common in training images for cat of the input data (i.e. images 504 and 505). Similarly, features for the classification 'dog' may include "white color", "2 eyes", "3 legs", "tail", "tongue" etc. It may be noted that if neurons corresponding to the above relevant features are activated for all inputs for a classification into a particular class, then these relevant features are considered as mandatory features.

Now, assuming there are 10 neurons {n1, n2, n3, ... n10}, and each neuron may correspond to one feature. For example, neuron n1 may correspond to the feature 'color', neuron n2 may correspond to the feature 'fur', neuron n3 may correspond to the feature 'eye, neuron n4 may correspond to the feature 'legs, neuron n5 may correspond to the feature 'tail, neuron n6 may correspond to the feature 'tongue, and so on. If neurons n1, n2, n3, and n4 are activated whenever a cat image is received, then a first CFD determined may be given below: "For an image to classify as a 'Cat', the neurons n1, n2, n3, & n4 should always be activated"

For determining other CFDs like a minimum and a maximum value for a feature, a number of neurons activated in a neural layer, etc., a neuron range may be calculated. In order to do so, a feature value or a neuron value may be calculated using the following formula:

$$y=W*x+b$$

where,
y=neuron/feature value
W=weight of the neuron which is calculate during training
x=input value to that neuron
b=bias value The value 'x' may be obtained by converting an input to a vector form, using one of known techniques, for example, 'word2vec', 1-hot-encoding', 'image pixel vector', etc. Upon calculating the neuron value 'y' for each neuron, the highest and lowest value among the neurons may be identified. For example, assuming neuron values 'y' for the neurons {n1, n2, ... n10} are {y1, y2, y3, ..., y10}, and if 'y3' has the highest value and 'y5' has the lowest value for classification "cat", then a second CFD determined may be as given below:

"For an input to be classified as 'Cat', the value of each feature should be within the value of y5 and y3"

Similarly, a number of neurons activated in a neural layer may be determined to form a third CFD.

At step 404, one or more missing features may be identified. It may be understood that missing features may be responsible for the ANN model giving a wrong result. When a new input is received, then during generation of the output by the ANN model, the neuron values may be calculated and compared with each CFD to obtain one or more differentiating neurons. For example, neurons that are not activated as per the one or more CFDs for the correct class of the input may be the differentiating neurons. These neurons may correspond to missing features in the wrongly classified input data. In other words, these differentiating neurons or missing features may be the reason for false positive or false negative in the ANN model. These missing features may be passed through an interpreter and may then be provided to the user in a user-understandable format.

For example, when the new image (second input data) is passed through the ANN model, the features that the 'dog' has may include "white color", "fur", "3 legs", etc. Since these features are similar to the features of a 'cat', the ANN model may generate the output for the new image as 'cat'.

It may be noted that mandatory neurons for dogs –'n5' and 'n6'—are not activated as the new image doesn't include 'tongue' and 'tail'. Therefore, when the new image is passed through the first CFD, it fails for 'dog' classification due to inactivated mandatory neurons. As such, a user may input features that were not there to classify the new image as a dog i.e. 'tail' and 'tongue'. These features may be input in form of vectors. This information may be passed to the next step to interpret the value of 'n5' and 'n6' into a human understandable format. Based on this information, the user may add more training data, for example, image of dogs without tail and tongue. As a result, the model is improved, and wrong predictions are reduced.

At step 405, the features may be interpreted to human understandable format. By way of an example, the missing features may be converted into human understandable formats using known techniques like 'LSTMViz', 'ConvNet-Viz', etc. Upon converting, the missing features may be displayed to the user. Based on these interpretations, the user may understand the reason behind the decision and make the necessary changes to improve the accuracy and performance of the network. For example, using a technique like 'CNN-Viz' to interpret the vectors to human understandable format, the features which were missing in the image may be identified. Based on these missing features, a user may add similar data to his dataset and train the ANN model again to improve the accuracy of the ANN model.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
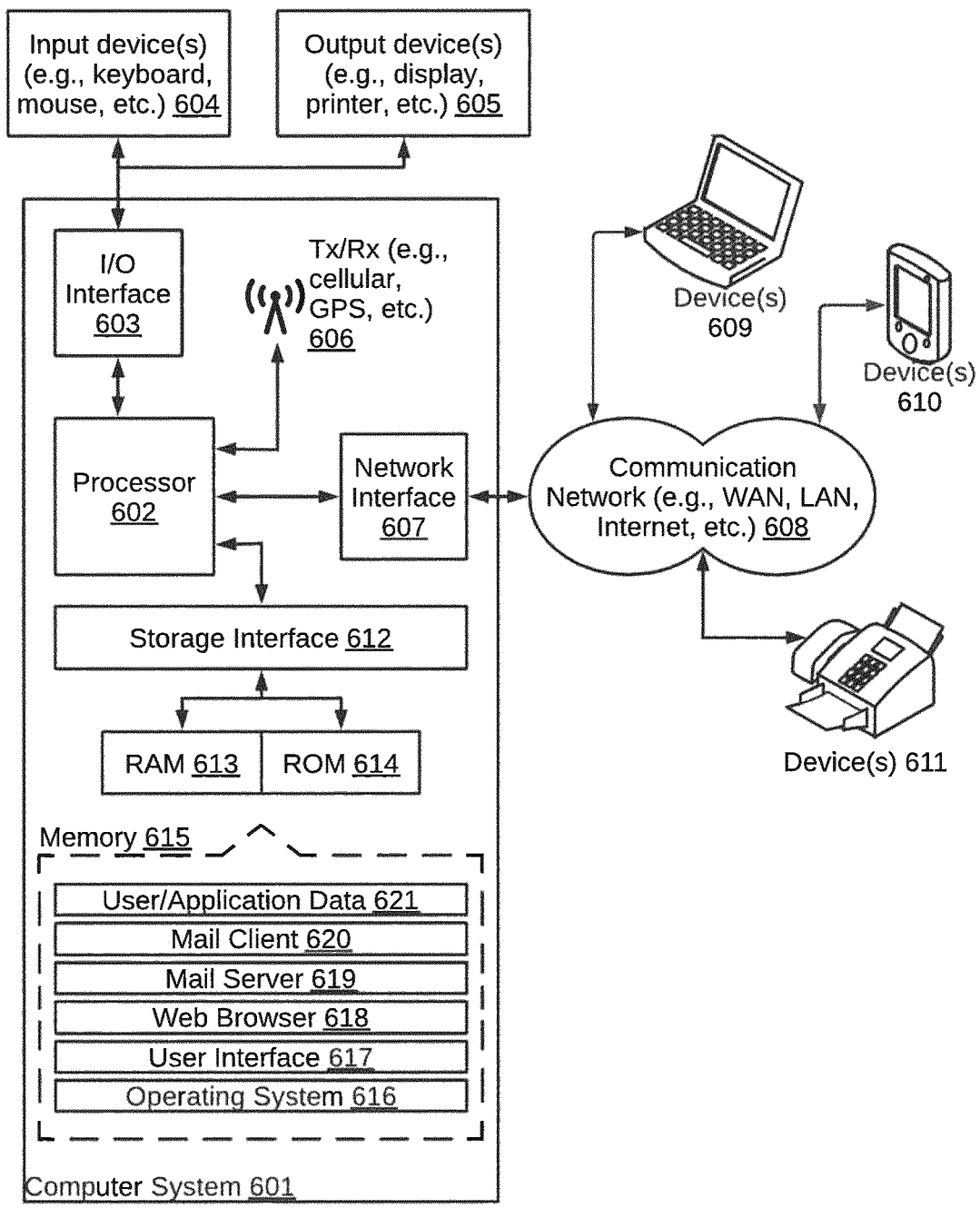
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing system 100 or the associated ANN classification device 101 for improving performance of an ANN. Computer system 601 may include a central processing unit ("CPU" or "processor") 602. Processor 602 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, AMA's application, embedded or secure processors, IBM® POWERPC®, INTEL® CORE® processor, ITANIUM® processor, XEON® processor, CELERON® processor or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo. IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM4550IUB8®, INFINEON TECHNOLOGIES@ X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO@ DS®, SONY® PLAYSTATION®, etc.), or the like.

In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, Infini-Band, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACK-BERRY® OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 601 may implement a web browser 618 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 601 may implement a mail server 619 stored program component. The mail server may be an Internet mail server such as MICROSOFT® EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 601 may implement a mail client 620 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 601 may store user/application data 621, such as the data, variables, records, etc. (e.g., activated neurons data, Characteristic Feature Directives (CFDs) data, differentiating neurons data, missing features data, new training data, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above are not routine, or conventional, or well understood in the art. The techniques discussed above provide for improving classifications performed by an ANN by determining one or more differentiating neurons for the neural layer based on the analysis of the one or more activated neurons in the neural layer. In particular, the techniques discussed above provide for using characteristic feature directives (CFDs) to reduce wrong predictions. Further, the techniques provide for predicting what should be the value of a feature, range of the feature value, and unwanted features in a neural layer, based on the CFDs. Based on the CFDs obtained, the reason for a particular output decision corresponding to the input can be interpreted in human understandable format. Using these decisive output results, the user can make necessary changes to the dataset while training the network again for its improved performance. As such, the techniques provide for an intelligent solution for understanding how the neural network decisions are made inside the block box and improving its efficiency using characteristic feature directive values, to thereby reduce wrong predictions.

Further, the techniques described above may be employed in any kind of ANN including, but not limited to, deep neural network (DNN) such as recurrent neural network (RNN), convolutional neural network (CNN), or the like. Moreover, the techniques may be easily deployed in any cloud-based servers for access and use as an 'application as a service' by any computing device including mobile device. For example, the ANN classification device 101 may be implemented on a cloud-based server and used for improving performance of various ANN based mobile device applications.

The specification has described method and system for improving classifications performed by an ANN model. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of improving classifications performed by an Artificial Neural Network (ANN) model, the method comprising:
   identifying, by an ANN classification device and for a classification performed by the ANN model for an input, one or more activated neurons in one or more neural layers of the ANN model, wherein the one or more activated neurons are neurons achieving respective activation threshold values for the input and corresponding to one or more relevant features associated with the input;
   analyzing, by the ANN classification device, the one or more activated neurons in the one or more neural layers with respect to one or more Characteristic Feature Directive (CFDs) for the one or more neural layers and for a correct class of the input, wherein the one or more CFDs are generated after a training phase of the ANN model and based on one or more neurons in the one or more neural layers that are activated for a training input of the correct class;
   determining, by the ANN classification device, one or more differentiating neurons in the one or more neural layers based on the analysis, wherein the one or more differentiating neurons are neurons that are not activated as per the one or more CFDs for the correct class of the input; and
   providing, by the ANN classification device, one or more missing features based on the one or more differentiating neurons in the one or more neural layers for improving classifications performed by the ANN model.

2. The method of claim 1, wherein providing the one or more missing features further comprises providing the one or more missing features in a user-understandable format to a user.

3. The method of claim 1, further comprising re-training the ANN model with new training data associated with the one or more missing features.

4. The method of claim 1, further comprising generating the one or more CFDs for each neural layer of the ANN model and for each class of training data after the training phase of the ANN model.

5. The method of claim 4, wherein generating the one or more CFDs for a neural layer and for a class comprises:
   identifying a training input of the class in the training data;
   identifying, for a classification performed by the ANN model for the training input of the class, one or more activated neurons in the neural layer, wherein the one or more activated neurons are neurons that achieve respective activation threshold values for the training input of the class; and
   generating the one or more CFDs for the neural layer and for the class based on the one or more activated neurons in the neural layer.

6. The method of claim 1, wherein the one or more CFDs in a neural layer comprises a maximum value associated with the one or more activated neurons in the neural layer, a minimum value associated with the one or more activated neurons in the neural layer, a number of the one or more activated neurons in the neural layer, a list of the one or more activated neurons in the neural layer, and one or more mandatory neurons in the neural layer for performing the classification in the correct class.

7. The method of claim 1, wherein the ANN model is a Convolutional Neural Network (CNN) model.

8. A system for improving classifications performed by an Artificial Neural Network (ANN) model, the system comprising:
   an ANN classification device comprising at least one processor and a computer-readable medium storing instructions that, when executed by the at least one processor, cause the at least one processor to perform operations comprising:
      identifying, for a classification performed by the ANN model for an input, one or more activated neurons in one or more neural layers of the ANN model, wherein the one or more activated neurons are neurons achieving respective activation threshold values for the input and corresponding to one or more relevant features associated with the input;
      analyzing the one or more activated neurons in the one or more neural layers with respect to one or more Characteristic Feature Directive (CFDs) for the one or more neural layers and for a correct class of the input, wherein the one or more CFDs are generated after a training phase of the ANN model and based on one or more neurons in the one or more neural layers that are activated for a training input of the correct class;
      determining one or more differentiating neurons in the one or more neural layers based on the analysis, wherein the one or more differentiating neurons are neurons that are not activated as per the one or more CFDs for the correct class of the input; and
      providing one or more missing features based on the one or more differentiating neurons in the one or more neural layers for improving classifications performed by the ANN model.

9. The system of claim 8, wherein providing the one or more missing features further comprises providing the one or more missing features in a user-understandable format to a user.

10. The system of claim 8, wherein operations further comprise re-training the ANN model with new training data associated with the one or more missing features.

11. The system of claim 8, wherein operations further comprise generating the one or more CFDs for each neural layer of the ANN model and for each class of training data after the training phase of the ANN model.

12. The system of claim 11, wherein generating the one or more CFDs for a neural layer and for a class comprises:
   identifying a training input of the class in the training data;
   identifying, for a classification performed by the ANN model for the training input of the class, one or more activated neurons in the neural layer, wherein the one or more activated neurons are neurons that achieve respective activation threshold values for the training input of the class; and generating the one or more CFDs for the neural layer and for the class based on the one or more activated neurons in the neural layer.

13. The system of claim 8, wherein the one or more CFDs in a neural layer comprises a maximum value associated with the one or more activated neurons in the neural layer, a minimum value associated with the one or more activated neurons in the neural layer, a number of the one or more activated neurons in the neural layer, a list of the one or more activated neurons in the neural layer, and one or more mandatory neurons in the neural layer for performing the classification in the correct class.

14. The system of claim 8, wherein the ANN model is a Convolutional Neural Network (CNN) model.

15. A non-transitory computer-readable medium storing computer-executable instructions for improving classifications performed by an Artificial Neural Network (ANN) model, the computer-executable instructions configured for:
identifying, for a classification performed by the ANN model for an input, one or more activated neurons in one or more neural layers of the ANN model, wherein the one or more activated neurons are neurons achieving respective activation threshold values for the input and corresponding to one or more relevant features associated with the input;
analyzing the one or more activated neurons in the one or more neural layers with respect to one or more Characteristic Feature Directive (CFDs) for the one or more neural layers and for a correct class of the input, wherein the one or more CFDs are generated after a training phase of the ANN model and based on one or more neurons in the one or more neural layers that are activated for a training input of the correct class;
determining one or more differentiating neurons in the one or more neural layers based on the analysis, wherein the one or more differentiating neurons are neurons that are not activated as per the one or more CFDs for the correct class of the input; and
providing one or more missing features based on the one or more differentiating neurons in the one or more neural layers for improving classifications performed by the ANN model.

16. The non-transitory computer-readable medium of claim 15, wherein providing the one or more missing features further comprises providing the one or more missing features in a user-understandable format to a user.

17. The non-transitory computer-readable medium of claim 15, wherein operations further comprise re-training the ANN model with new training data associated with the one or more missing features.

18. The non-transitory computer-readable medium of claim 15, wherein the computer-executable instructions are further configured for generating the one or more CFDs for each neural layer of the ANN model and for each class of training data after the training phase of the ANN model.

19. The non-transitory computer-readable medium of claim 18, wherein generating the one or more CFDs for a neural layer and for a class comprises:
identifying a training input of the class in the training data;
identifying, for a classification performed by the ANN model for the training input of the class, one or more activated neurons in the neural layer, wherein the one or more activated neurons are neurons that achieve respective activation threshold values for the training input of the class; and
generating the one or more CFDs for the neural layer and for the class based on the one or more activated neurons in the neural layer.

20. The non-transitory computer-readable medium of claim 15, wherein the one or more CFDs in a neural layer comprises a maximum value associated with the one or more activated neurons in the neural layer, a minimum value associated with the one or more activated neurons in the neural layer, a number of the one or more activated neurons in the neural layer, a list of the one or more activated neurons in the neural layer, and one or more mandatory neurons in the neural layer for performing the classification in the correct class.

* * * * *